Sept. 22, 1925.
J. W. MYERS
BODY SUSPENSION FOR VEHICLES
Filed Oct. 7, 1922
1,554,457
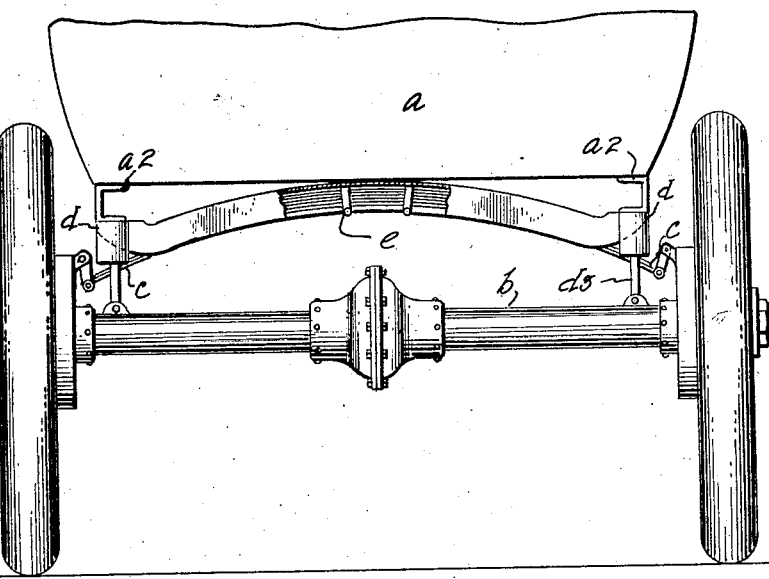
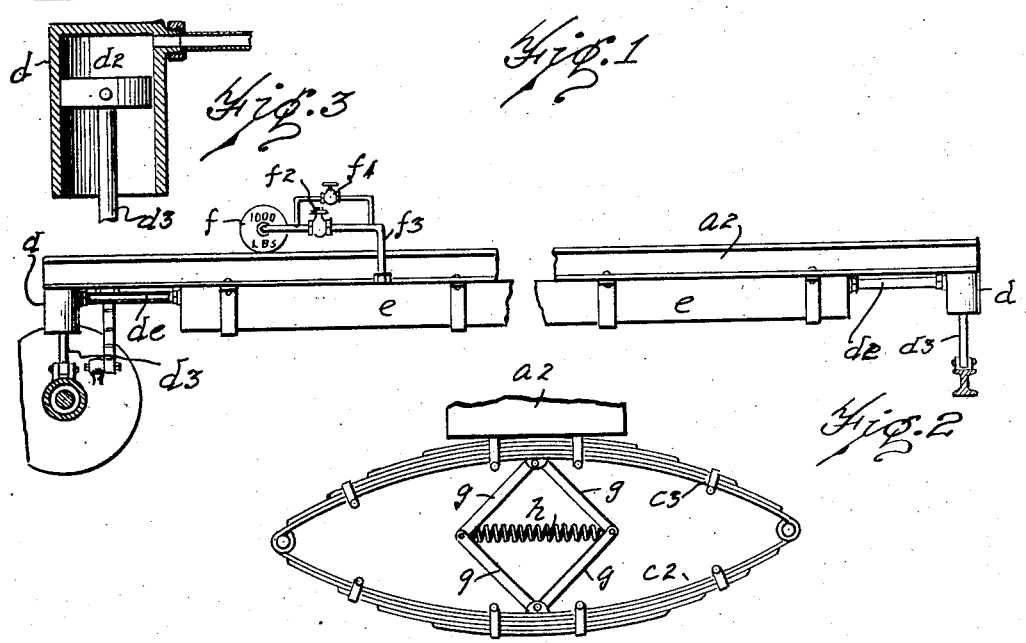
Inventor
Joseph W. Myers
By Ralzemond A. Parker
Attorney Patented Sept. 22, 1925.

1,554,457

UNITED STATES PATENT OFFICE.

JOSEPH W. MYERS, OF JACKSON, MICHIGAN.

BODY SUSPENSION FOR VEHICLES.

Application filed October 7, 1922. Serial No. 593,046.

*To all whom it may concern:*

Be it known that I, JOSEPH W. MYERS, a citizen of the United States, residing at Jackson, county of Jackson, State of Michigan, have invented a certain new and useful Improvement in Body Suspensions for Vehicles, and declare the following to be a full, clear, and exact description of the same, such as will enable others skilled in the art to which it pertains to make and use the same, reference being had to the accompanying drawings, which form a part of this specification.

My invention relates to a method and apparatus for supporting vehicle bodies, and the immediate and special object of my improvements is to provide an improved means for suspending the bodies of automobiles, in which special connection I have illustrated it in the accompanying drawing.

In automobiles as heretofore constructed the springs have two functions: one to suspend the weight of the body and chassis, the other to maintain said parts in their relative position to the axle or when displaced therefrom to restore them to such position. An object of my invention is to separate these functions and to provide apparatus to conserve each of said functions independently of the other. To this end I support the weight of the body and chassis by a yielding resistance which does not vary its tension with the variation of the relative position of the load and the axle and which permits of free relative motion thereof and provide a resilient part which shall maintain the body and chassis, or load, in a relative position to the axle or restore it when displaced.

In a co-pending application filed in the United States Patent Office, August 6, 1925, Serial No. 48,443, I have shown and claimed a spring the tension of which varies a very little with the distance between the load and axle, in combination with means for adjusting the initial tension of the spring.

In the accompanying drawing,—

Figure 1 is an elevation of an apparatus embodying my invention with so much of an automobile as is necessary to illustrate its connection therewith. The automobile is shown in rear elevation.

Fig. 2 is a longitudinal section of an automobile with apparatus embodying my invention attached thereto.

Fig. 3 is a detail sectional view showing a supporting cylinder and a piston therein.

Fig. 4 is a detail elevation showing a modified form of apparatus embodying my invention.

Referring in the first place to Figs. 1, 2 and 3, $a$ indicates the body of an automobile and $a^2$ $a^2$ the chassis or frame. $d$ is the rear axle. $c$ is a spring which may be of ordinary construction though of much less strength and rigidity than is usually used.

$d$ $d$ indicate inverted cylinders secured to the frame $a^2$ with their lower ends open. $d^2$ indicates a piston in each of said cylinders. $d^3$ is a connecting rod joining the piston $d^2$ and the axle of the automobile. $e$ is a reservoir of considerable capacity. $de$ $de$ are pipes or passages continually open and connecting the cylinders $d$ $d$ above the pistons $d^2$ therein with the tank $e$. The passages $de$ are of sufficient capacity and are entirely unobstructed. $f$ indicates a reservoir for compressed air. $f^3$ is a pipe connecting the reservoir $f$ with the reservoir $e$. $f^2$ is a reducing valve in the connecting pipe $f^3$. $f^4$ is a cock controlling a by-pass by which air can be admitted from the reservoir $f$ to the reservoir $e$ without passing through the reducing valve $f^2$.

The operation of the above described apparatus is as follows: Compressed air is supplied to the reservoir $e$ to a pressure that shall just support the body and chassis with its load. The reservoir $e$ is so large relative to the cylinders $d$ that as the chassis and body move up and down relative to the axle, and therefore the pistons $d^2$ move in the cylinders $d$, the pressure of air above the pistons will not be substantially varied, so that in all positions the load upon the axle is just balanced by the air pressure. Thus when the wheels pass over an obstruction or drop in a rut, the pressure upon the pistons drives the axle with its wheels downward or permits them to rise, as the case may be, relative to the body $a$ and chassis $a^2$ without varying so far as this supporting agency is concerned the force exerted upon the body. Therefore, the body will tend to remain in one position and will not vary its position as the position of the axle and wheels is varied.

In order to hold the body chassis and load generally in its relative position to the axle and restore it thereto when displaced from such relative position, I provide a very light spring $c$ that varies with the distance apart of the axles and the load supported thereon.

A reservoir of air $f$ under high compression may be carried and the pressure $e$ in the reservoir $e$ kept constant by a reducing valve or varied at will to correspond to varying loads as desired.

Other forms of constant supporting apparatus may be used and I have indicated one in Fig. 4 in which $g\ g\ g\ g$ indicate toggle joint linkage extending between the load and the axle, or in this instance between the two parts of an elliptical spring. $h$ is a spiral tension spring extending horizontally between the intermediate joints of the toggle linkage $g$.

It will be observed that in the construction of Fig. 4 when the load descends the spring $h$ will be extended and its tension increased but at the same time the leverage at which it acts through the linkage will be diminished so that a substantially constant resilient support is thereby provided.

What I claim is:

1. In a vehicle, the combination of an axle, a load to be supported on said axle, means intermediate said load and axle affording a substantially constant support to the load at different relative positions of the load and axle at whatever rate the distance between said load and axle may vary, and means acting to restore said load and axle to their normal relative positions whenever they vary therefrom.

2. The mode of carrying a load upon a vehicle axle consisting in supporting the load by a means which exerts a substantially constant force, and maintaining the load in its position vertically relative to the axle by another means.

3. The mode of carrying a load upon a vehicle axle, consisting in supporting the load by a resilient resistance which does not substantially vary with the varying relative position of the load and axle and acting upon said load by a resilient force that is brought into action by every variation of the relative position of said load and axle.

4. The combination of a vehicle body, an axle, a cylinder interposed between said body and axle, a piston in said cylinder, said piston being connected with the said axle and said cylinder with said body, a compressed air reservoir, continuously open unobstructed passage between said cylinder and reservoir, and a spring that varies its tension with every variation of the relative position of the body and axle said spring being interposed between said body and axle, substantially as and for the purpose described.

5. The combination of a vehicle body, an axle, a cylinder interposed between said body and axle, a piston in said cylinder, said piston being connected with the said axle and said cylinder with said body, a compressed air reservoir of great capacity, a continuously open unobstructed passage between said cylinder and reservoir, a spring that varies its tension with every variation of the relative position of the body and axle said spring being interposed between said body and axle, and means for varying the tension of air in said reservoir, substantially as and for the purpose described.

6. In a vehicle, the combination of an axle, a load to be supported on said axle, means intermediate said load and axle affording a substantially constant support to the load as the relative positions of the load and axle vary, means affording a variable resilient action between said load and axle, and means for varying the strength of said supporting means at will.

In testimony whereof, I sign this specification.

JOSEPH W. MYERS.